(12) United States Patent
Sekita (10) Patent No.: US 9,083,813 B2
(45) Date of Patent: Jul. 14, 2015

(54) COMMUNICATION TERMINAL, COMMUNICATION METHOD, AND PROGRAM

(75) Inventor: Suguru Sekita, Saitama (JP)

(73) Assignee: FELICA NETWORKS, INC., Tokyo (JP)

( * ) Notice: Subject to any disclaimer, the term of this patent is extended or adjusted under 35 U.S.C. 154(b) by 447 days.

(21) Appl. No.: 13/428,394

(22) Filed: Mar. 23, 2012

(65) Prior Publication Data

US 2012/0249337 A1  Oct. 4, 2012

(30) Foreign Application Priority Data

Mar. 30, 2011 (JP) ................................. 2011-074425

(51) Int. Cl.
G08B 21/00 (2006.01)
H04M 1/725 (2006.01)
H04B 5/00 (2006.01)
H04L 29/14 (2006.01)
H04W 4/00 (2009.01)

(52) U.S. Cl.
CPC ........... *H04M 1/7253* (2013.01); *H04B 5/0031* (2013.01); *H04L 69/40* (2013.01); *H04M 2250/04* (2013.01); *H04W 4/008* (2013.01)

(58) Field of Classification Search
USPC .............................. 340/10.1, 10.2, 10.3, 572.8
See application file for complete search history.

(56) References Cited

U.S. PATENT DOCUMENTS

| | | | | |
|---|---|---|---|---|
| 5,029,183 A | * | 7/1991 | Tymes ........................... | 375/141 |
| 5,602,956 A | * | 2/1997 | Suzuki et al. ................. | 386/346 |
| 5,945,660 A | * | 8/1999 | Nakasuji et al. ......... | 235/462.46 |
| 6,307,468 B1 | * | 10/2001 | Ward, Jr. ....................... | 340/505 |
| 6,427,065 B1 | * | 7/2002 | Suga et al. .................... | 455/41.1 |
| 6,842,606 B1 | * | 1/2005 | Takemura .................... | 455/41.1 |
| 7,319,396 B2 | * | 1/2008 | Homanfar et al. .......... | 340/572.1 |
| 7,433,651 B2 | * | 10/2008 | Rekimoto et al. ........... | 455/41.3 |
| 7,769,345 B2 | * | 8/2010 | Johnson et al. .............. | 455/41.1 |
| 8,014,791 B2 | * | 9/2011 | Guigne et al. ............. | 455/456.1 |
| 8,138,938 B2 | * | 3/2012 | Troy et al. ................... | 340/686.6 |
| 8,384,679 B2 | * | 2/2013 | Paleczny et al. .............. | 345/173 |
| 8,593,255 B2 | * | 11/2013 | Pang et al. .................... | 340/10.1 |
| 2002/0053973 A1 | * | 5/2002 | Ward, Jr. ....................... | 340/506 |
| 2005/0048949 A1 | * | 3/2005 | Uchida et al. ................. | 455/407 |

(Continued)

FOREIGN PATENT DOCUMENTS

| | | |
|---|---|---|
| EP | 0933910 B1 | 4/2006 |
| JP | 2010211577 A | 9/2010 |

(Continued)

OTHER PUBLICATIONS

European Search Report EP 12156554, dated Jul. 13, 2012.

*Primary Examiner* — Jennifer Mehmood
*Assistant Examiner* — Rufus Point
(74) *Attorney, Agent, or Firm* — Hazuki International, LLC (57) ABSTRACT

A communication terminal includes: a communication section configured to perform non-contact communication with an external apparatus; an alarming section; and a control section configured to determine a communication state of the communication section with the external apparatus, and if the communication state is determined to be a communication error state, the control section configured to cause the alarming section to give an alarm prompting a user to change a relative position of the communication terminal with the external apparatus on the basis of communication data at the time of the communication error.

10 Claims, 8 Drawing Sheets

(56) References Cited

U.S. PATENT DOCUMENTS

| | | | |
|---|---|---|---|
| 2006/0022815 A1* | 2/2006 | Fischer et al. | 340/505 |
| 2006/0052055 A1* | 3/2006 | Rowse et al. | 455/41.1 |
| 2006/0160488 A1* | 7/2006 | Sueoka et al. | 455/41.2 |
| 2006/0239675 A1* | 10/2006 | Iizuka et al. | 396/287 |
| 2007/0141997 A1* | 6/2007 | Wulff et al. | 455/78 |
| 2007/0205283 A1* | 9/2007 | Vesikivi et al. | 235/451 |
| 2008/0093447 A1* | 4/2008 | Johnson et al. | 235/383 |
| 2009/0052426 A1* | 2/2009 | Perraud | 370/338 |
| 2009/0184161 A1* | 7/2009 | Ueno et al. | 235/380 |
| 2009/0219142 A1* | 9/2009 | Ku et al. | 340/10.3 |
| 2010/0068996 A1* | 3/2010 | Haartsen | 455/41.1 |
| 2010/0207726 A1* | 8/2010 | Denis et al. | 340/5.74 |
| 2010/0316171 A1* | 12/2010 | Ino | 375/343 |
| 2011/0070825 A1 | 3/2011 | Griffin et al. | |

FOREIGN PATENT DOCUMENTS

| | | |
|---|---|---|
| WO | 2008039559 A1 | 4/2008 |
| WO | 2009075209 A1 | 6/2009 |

\* cited by examiner

| PREAMBLE | SYNC CODE | DATA | CRC |

FIG. 6

DISPLAY EXAMPLE1

DISPLAY EXAMPLE2

DISPLAY EXAMPLE3

DISPLAY EXAMPLE4

COMMUNICATION TERMINAL, COMMUNICATION METHOD, AND PROGRAM

CROSS-REFERENCE TO RELATED APPLICATION

The present application claims priority from Japanese Patent Application No. JP 2011-074425 filed in the Japanese Patent Office on Mar. 30, 2011, the entire content of which is incorporated herein by reference.

BACKGROUND

The present disclosure relates to a communication terminal, a communication method, and a program.

In recent years, communication apparatuses, such as a non-contact type IC (Integrated Circuit) card, an RFID (Radio Frequency Identification) tag, or a mobile phone including a non-contact type IC chip, etc., (in the following, referred to as "IC cards".) have become widespread. These apparatuses are capable of performing non-contact communication with a reader/writer (or a communication terminal including a reader/writer, which is simply referred to as a "reader/writer" hereinafter).

A communication apparatus, such as a reader/writer, an IC card, or the like, uses a carrier wave having a specific frequency, for example, 13.56 MHz, etc. Specifically, a reader/writer transmits a carrier wave including a carrier signal, and an IC card that receives the carrier wave through an antenna returns a response signal to the received carrier signal by load modulation. Thereby, communication is performed between the reader/writer and the IC card.

A related-art technique has been disclosed in Japanese Unexamined Patent Application Publication No. 2010-211577, for example.

SUMMARY

Incidentally, at least either one of a reader/writer or an IC card that performs non-contact communication is not fixed, and thus is movable. Thus, non-contact communication sometimes fails depending on a relative position of the reader/writer and the IC card. In such a case, it is necessary for a user of the reader/writer or the IC card to eliminate a communication failure state. However, there are cases where the user is not informed of causes of the communication failures and how to eliminate the causes. Accordingly, the user is not allowed to suitably get out of the communication failure state.

Thus, it is desirable to provide a communication terminal, a communication method, and a program that is capable of suitably eliminating a communication failure state at the time of communication failure in non-contact communication.

According to an embodiment of the present disclosure, there is provided a communication terminal including: a communication section configured to perform non-contact communication with an external apparatus; an alarming section; and a control section configured to determine a communication state of the communication section with the external apparatus, and if the communication state is determined to be a communication error state, the control section configured to cause the alarming section to give an alarm prompting the user to change a relative position of the communication terminal with the external apparatus on the basis of communication data at the time of the communication error.

Also, according to another embodiment of the present disclosure, there is provided a method of communication, including: a communication terminal performing non-contact communication with an external apparatus; the communication terminal determining a communication state with the external apparatus; and if the communication state is determined to be a communication error state, causing an alarming section of the communication terminal to give an alarm prompting the user to change a relative position of the communication terminal with the external apparatus on the basis of communication data at the time of the communication error.

Also, according to another embodiment of the present disclosure, there is provided a program for causing a computer to perform processing including: a communication terminal performing non-contact communication with an external apparatus; the communication terminal determining a communication state with the external apparatus; and if the communication state is determined to be a communication error state, causing an alarming section of the communication terminal to give an alarm prompting the user to change a relative position of the communication terminal with the external apparatus on the basis of communication data at the time of the communication error.

As described above, by the present disclosure, it is possible for a user, etc., to suitably eliminate a communication failure state at the time of communication failure in non-contact communication.

DETAILED DESCRIPTION OF EMBODIMENTS

In the following, detailed descriptions will be given of preferred embodiments of the present disclosure with reference to the attached drawings.

In this regard, in this specification and the drawings, a same reference numeral is given to a component having a substantially same functional configuration, and thus a duplicated description will be omitted.

In this regard, the descriptions will be given in the following order.

Figure 1:
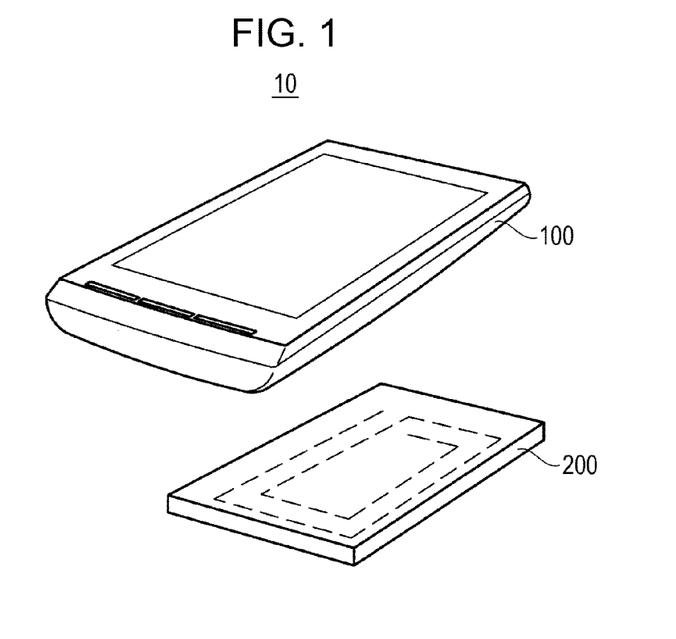
FIG. 1 is a diagram illustrating a configuration of a communication system.

1. Overview of Communication System
2. Configuration of Communication Terminal
3. Alarming Processing at the Time of Communication Failure
4. Summary 1. Overview of Communication System A description will be given of a communication system 10 according to the present embodiment with reference to FIG. 1. FIG. 1 is a diagram illustrating a configuration of the communication system 10.

The communication system 10 transmits and receives communication data through non-contact wireless communication. The communication system 10 includes a communication terminal 100 having a function of reader/writer, and an IC card 200 on which an IC chip is mounted. In the present embodiment, the communication terminal 100 is a mobile terminal, such as a mobile phone, for example. In this regard, the communication system 10 may include an automatic ticket gate as a communication terminal having a function of reader/writer in place of the mobile terminal. Also, in the present embodiment, the IC card 200 corresponds to the external apparatus. However, a mobile terminal, such as a mobile phone on which an IC chip is mounted, etc., may be the external apparatus.

In the communication system 10, a carrier wave having a specific frequency (for example, 13.56 MHz) is used for communication. Specifically, the communication terminal 100 transmits a carrier wave including a carrier signal, and the IC card 200 that has received the carrier wave through a communication antenna 204 described later returns a response signal to the received carrier signal. Thereby, communication is performed between the communication terminal 100 and the IC card 200.

Figure 2:
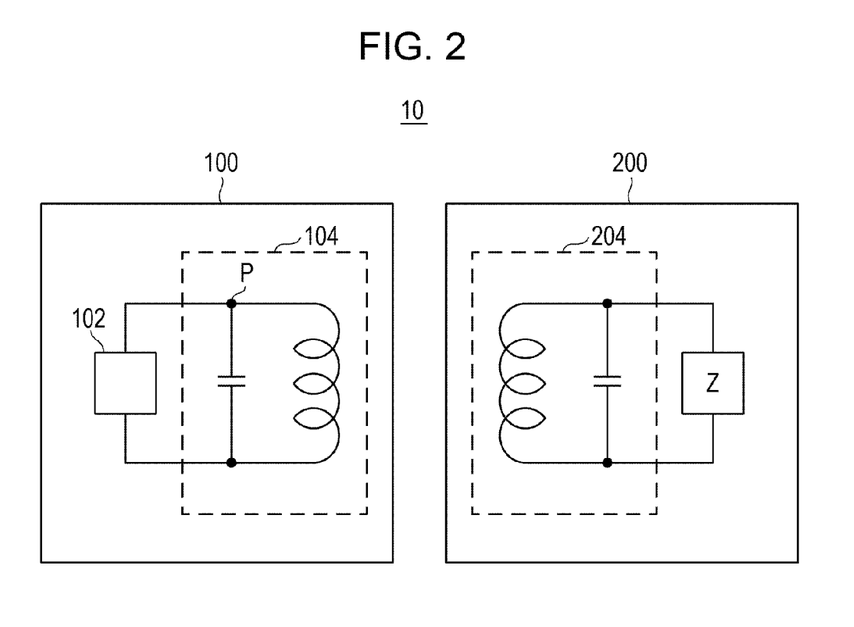
FIG. 2 is a circuit diagram illustrating schematic configurations of a communication terminal and an IC card.

Next, a description will be given of schematic configurations of the communication terminal 100 and the IC card 200 with reference to FIG. 2. FIG. 2 is a circuit diagram illustrating the schematic configurations of the communication terminal 100 and the IC card 200.

As illustrated in FIG. 2, the communication terminal 100 includes a modulation section 102 and a communication antenna 104, which is an example of the communication section.

The modulation section 102 receives a generation instruction of a carrier signal from a control section not illustrated in the figure, and generates a carrier signal in response to the instruction. In this regard, the carrier signal can include, for example, various processing instructions to the IC card 200 and data to be processed.

The communication antenna 104 has, for example, a coil having a predetermined inductance, and transmits the carrier wave including the carrier signal generated by the modulation section 102. Also, the communication antenna 104 receives the response signal from the IC card 200. In this regard, in FIG. 2, an example in which the communication antenna 104 includes a resonance circuit including the coil and a capacitor is illustrated.

As illustrated in FIG. 2, the IC card 200 includes the communication antenna 204 and a load Z. The load Z equivalently illustrates the IC chip mounted on the IC card 200.

The communication antenna 204 includes, for example a coil having a predetermined inductance, and receives the carrier wave including the carrier signal transmitted from the communication antenna 104. Also, the communication antenna 204 can make a response to the received carrier wave by load modulation.

In this regard, the communication terminal 100 detects a voltage of an antenna end P of the communication antenna 104 so as to make it possible to demodulate the response signal from the IC card 200.

Incidentally, in the communication system 10, if a relative position (relative distance) of the communication terminal 100 with the IC card 200 is a suitable position for non-contact communication, it is possible to perform normal communication. However, the communication terminal 100 and the IC card 200 have portability, and thus the relative position of the communication terminal 100 with the IC card 200 tends to vary. Accordingly, non-contact communication sometimes fails depending on the relative position of the communication terminal 100 with the IC card 200.

For example, in the case where the distance between the communication terminal 100 and the IC card 200 is out of a proper distance suitable for non-contact communication, or in the case where the communication terminal 100 and the IC card 200 are out of alignment in position, etc., non-contact communication sometimes fails. At the time of non-contact communication failure, it is necessary to get out of the communication failure state. However, there are cases where a user of the communication terminal 100 and the IC card 200 is not aware of causes of the communication failure and how to resolve the failure. Accordingly, it is not possible for the user to suitably eliminate the communication failure state.

Thus, in order to address the above-described problems, in the communication system 10 according to the present embodiment, if a communication state is determined to be a communication error state, processing (alarming processing at the time of communication failure) is performed to give an alarm prompting the user to change the relative position of the communication terminal 100 with the IC card 200 on the basis of communication data at the time of communication error (for example, to move the communication terminal 100). Thereby, the user is allowed to eliminate the communication error state by changing the relative position of the communication terminal 100 with the IC card 200 on the basis of the alarm contents. In this regard, details of the alarming processing at the time of communication failure will be described later.

2. Configuration of Communication Terminal According to the Present Embodiment

Figure 3:
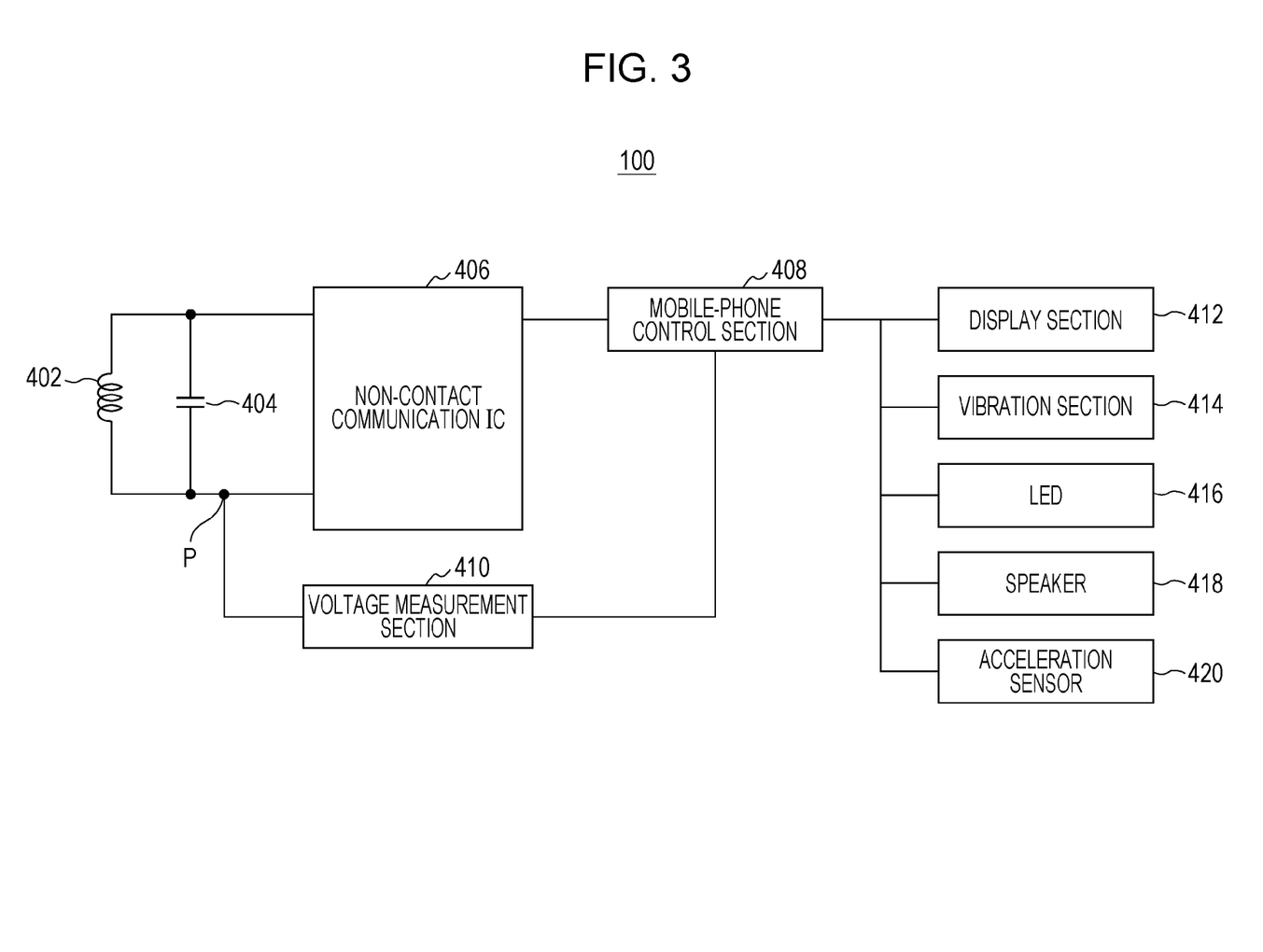
FIG. 3 is a diagram illustrating a detailed configuration of the communication terminal.

A description will be given of a detailed configuration of the communication terminal 100 according to the present embodiment with reference to FIG. 3. FIG. 3 is a diagram illustrating a detailed configuration of the communication terminal 100.

As illustrated in FIG. 3, the communication terminal 100 includes an antenna coil 402, a resonance capacitor 404, a non-contact communication IC 406, a mobile-phone control section 408, which is an example of the control section, a voltage measurement section 410, a display section 412, a vibration section 414, an LED 416, which is an example of the light-emitting section, a speaker 418, which is an example of the sound output section, and an acceleration section 420, which is an example of a movement detection section.

The antenna coil 402 and the resonance capacitor 404 constitute the communication antenna 104 in FIG. 2. Also, the antenna coil 402 and the resonance capacitor 404 form a resonance circuit.

The non-contact communication IC 406 performs a function of non-contact communication in the communication terminal 100. The non-contact communication IC 406 determines whether data reception of the communication data from the IC card 200 is possible at the time of non-contact communication.

Figure 4:
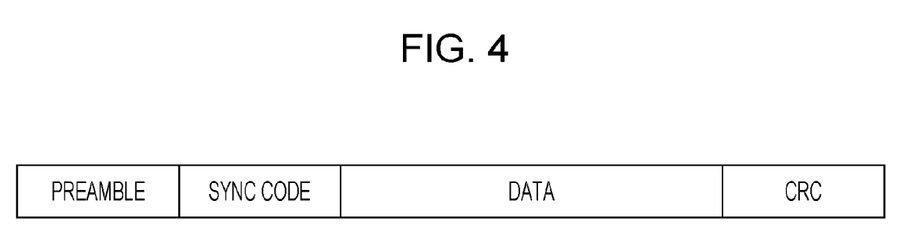
FIG. 4 is a diagram illustrating a data structure of communication data.

Here, a description will be given of communication data that is received by the communication terminal 100 from the IC card 200 with reference to FIG. 4. FIG. 4 is a diagram illustrating a data structure of the communication data. As illustrated in FIG. 4, the communication data received from the IC card 200 is packet data, and includes a preamble, a SYNC code, a data main body (also simply called "data"), and a CRC (Cyclic Redundancy Check).

The preamble is disposed in order to obtain synchronization in non-contact communication. The SYNC code corresponds to the additional part, and is a code indicating a start position of the data main body. The data main body is actual data to be processed by the communication terminal 100. The CRC detects an error in the communication data. In this regard, the communication data is received in the order of the preamble, the SYNC code, the data main body, and the CRC. That is to say, the preamble is received first, and the CRC is received last.

Figure 5:
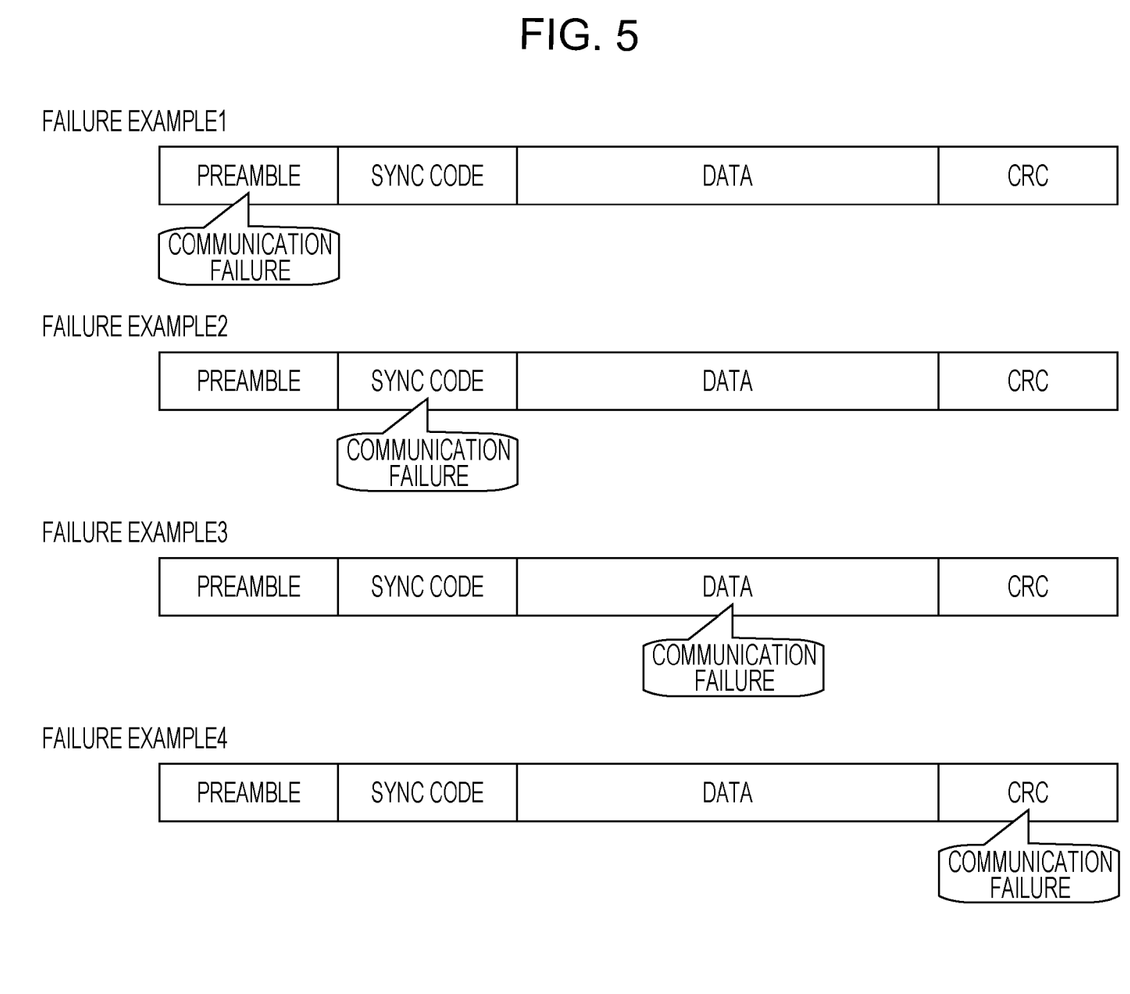
FIG. 5 is a diagram illustrating examples of communication failures.

The non-contact communication IC 406 determines a communication error part in the communication data at the time of communication failure. Specifically, as illustrated in FIG. 5, the non-contact communication IC 406 determines in which part of the packet data, that is to say, whether in the preamble, in the SYNC code, in the data main body, or in the CRC, the communication error has occurred. The non-contact communication IC 406 performs error determination in the order of the preamble, the SYNC code, the data main body, and the CRC. For example, if an error is determined in the preamble, error determination is not performed for the SYNC code, the data main body, and the CRC. Thereby, it becomes possible to shorten determination time. The non-contact communication IC 406 outputs a determination result to the mobile-phone control section 408.

FIG. 5 is a diagram illustrating examples of communication failures. Failure example 1 in FIG. 5 illustrates a case where a communication failure has occurred at preamble in packet data. Failure example 2 illustrates a case where a communication failure has occurred at SYNC code. Failure example 3 illustrates a case where a communication failure has occurred at data main body. Failure example 4 illustrates a case where a communication failure has occurred at CRC.

The voltage measurement section 410 measures a voltage of the antenna end P in the communication antenna 104. And the voltage measurement section 410 outputs a measurement result of the voltage at the antenna end P to the mobile-phone control section 408.

In the present embodiment, at least one of the display section 412, the vibration section 414, the LED 416, and the speaker 418 functions as an alarming section that gives an alarm prompting the user to change a relative position of the communication terminal 100 with the IC card 200 (movement of the communication terminal 100).

The display section 412 displays various kinds of information (messages). The display section 412 displays a message prompting the user to change the relative position of the communication terminal 100 with the IC card 200 at the time of non-contact communication failure with the IC card 200. For example, as illustrated in FIG. 6, the display section 412 displays a message prompting the user to move the communication terminal 100.

Figure 6:
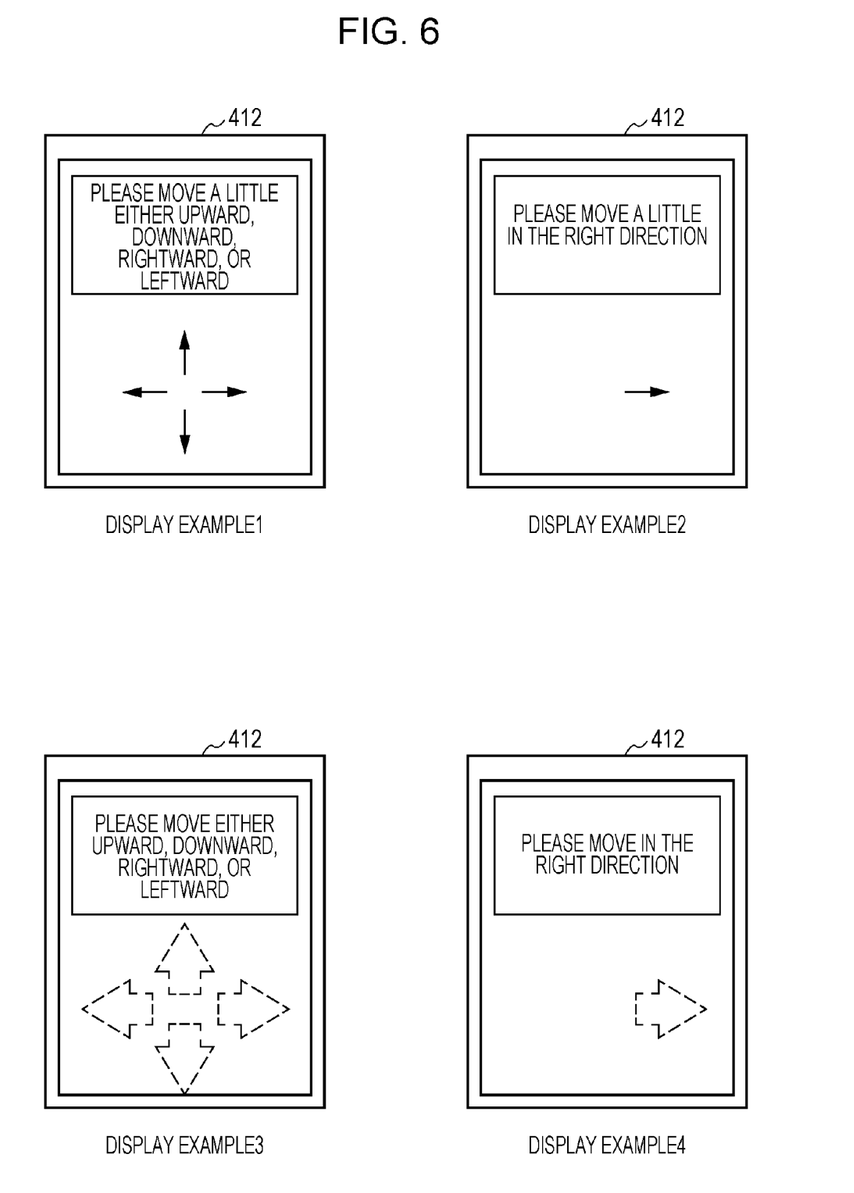
FIG. 6 is a diagram illustrating states in which a message prompting a user to change a relative position of the communication terminal is displayed on a display section at the time of non-contact communication failure.

FIG. 6 is a diagram illustrating states in which a message prompting the user to move the communication terminal 100 is displayed on a display section 412 at the time of non-contact communication failure. In a display example 1 and a display example 3 in FIG. 6, a message prompting the user to move the communication terminal 100 either upward, downward, rightward, or leftward is displayed. The difference between the display example 1 and the display example 3 is that in the case of the display example 1, an amount of movement of the communication terminal 100 is small, whereas in the case of the display example 3, an amount of movement of the communication terminal 100 is large. Also, in a display example 2 and a display example 4, a message prompting the user to move the communication terminal 100 a little in the right direction is illustrated. The difference between the display example 2 and the display example 4 is that in the case of the display example 2, an amount of movement of the communication terminal 100 is small, whereas in the case of the display example 4, an amount of movement of the communication terminal 100 is large.

The vibration section 414 has a vibrator, and vibrates a main body of the communication terminal 100. The vibration section 414 vibrates at the time of non-contact communication failure so as to make it possible to give an alarm indicating a communication error state. Also, the vibration section 414 may vibrate with a variety of degrees of vibration at the time of non-contact communication failure. For example, in the case of prompting the user to move the communication terminal 100 greatly, the vibration section 414 may vibrate greatly, whereas in the case of prompting the user to move the communication terminal 100 a little, the vibration section 414 may vibrate a little. Also, the vibration section 414 may also change a vibration pattern (rhythm) in order to specify a movement direction of the communication terminal 100.

The LED 416 emits light in a plurality of colors. The LED 416 emits light at the time of non-contact communication failure so as to prompt the user to move the communication terminal 100. For example, the LED 416 may emit red light in order to prompt the user to move the communication terminal 100 in the left direction, and may emit blue light in order to prompt the user to move the communication terminal 100 in the right direction. Also, the LED 416 may change a lighting pattern (for example, changing a lighting time period) in order to alarm a difference in the amount of movement of the communication terminal 100.

The speaker 418 outputs a sound. The speaker 418 outputs a sound (for example, a message voice displayed on the display section 412 in FIG. 6) at the time of non-contact communication failure in order to prompt the user to move the communication terminal 100.

In this manner, the alarming section of the display section 412, etc., gives an alarm prompting the user to change the relative position (movement the communication terminal 100) of the communication terminal 100 with the IC card 200 so that the user is aware of a solution of a non-contact communication failure. Accordingly, the user changes the relative position (moves the communication terminal 100) of the communication terminal 100 with the IC card 200 on the basis of the alarm contents so as to make it possible to suitably eliminate the communication error state.

The acceleration section 420 detects movement, etc., of the communication terminal 100 after the alarming section of the display section 412, etc., has given the alarm. For example, the acceleration section 420 detects an angle and movement of the communication terminal 100 when the user has moved the communication terminal 100. And the acceleration section 420 outputs the detection result of the communication terminal 100 to the mobile-phone control section 408.

The mobile-phone control section 408 controls the entire mobile phone, which is a communication terminal 100. The mobile-phone control section 408 determines a communication state of the communication antenna 104 with the IC card 200 on the basis of the determination result of receive data by the non-contact communication IC 406. And if the mobile-phone control section 408 determines that the communication state is a communication error state, the mobile-phone control section causes the alarming section of the display section 412, etc., to give an alarm prompting the user to change the relative position (movement of the communication terminal 100) of the communication terminal 100 with the IC card 200 on the basis of the communication data at the time of communication error. Thereby, the user changes the relative position (moves the communication terminal 100) of the communication terminal 100 with the IC card 200 on the basis of the alarm contents.

The mobile-phone control section 408 gives an alarm with varying an amount of change (amount of movement) of the relative position of the communication terminal 100 with the IC card 200 in accordance with the communication error part in the packet data in FIG. 4. Specifically, the mobile-phone control section 408 determines the amount of movement of the communication terminal 100 in the case of a communication error in a part having an early reception order from the IC card 200 of the packet data (for example, the preamble) to be greater than the amount of movement of the communication terminal 100 in the case of a communication error in a part having a late reception order (for example, the CRC).

Here, a description will be given of a reason for giving an alarm by varying the amount of movement of the communication terminal 100 in accordance with a communication error part in the packet data. As described above, the packet data in FIG. 4 is received in the order of the preamble, the SYNC code, the data main body, and the CRC. The non-contact communication IC 406 performs error determination in the order of the preamble, the SYNC code, the data main body, and the CRC. And in the case of a communication error in the SYNC, it is possible to assume that there is a high possibility that a communication error also occurs in the data main body and the CRC, and thus it is possible to assume that the communication state between the communication terminal 100 and the IC card 200 is bad. On the other hand, in the case of a communication error in the CRC, there is no error in the preamble, the SYNC code, the data main body that were determined before, and thus it is possible to assume that a degree of the communication error is smaller than that of a communication error in the preamble. On the contrary, it is possible to say that the communication state is very bad in the case of a communication error in the preamble and the SYNC code.

Thus, in the communication terminal 100 according to the present embodiment, in the case of a communication error in a CRC, an alarm is given to move the communication terminal 100 a little, and in the case of a communication error in a preamble or a SYNC, an alarm is given to move the communication terminal 100 greatly. Accordingly, an alarm is given such that the amount of movement of the communication terminal 100 is changed in accordance with the communication error part in packet data so that the user is allowed to suitably resolve the communication error state.

If the mobile-phone control section 408 determines that the communication error continues after the acceleration section 420 has detected movement of the communication terminal 100, the mobile-phone control section 408 causes the alarming section to give an alarm to move in a direction different from the movement direction detected by the acceleration section 420 (for example, in the opposite direction), to the display section 412, etc. Thereby, even if the communication error is not resolved by the movement of the communication terminal 100 after the immediate alarming, it is possible to resolve the communication error by the user moving the communication terminal 100 in a direction different from the movement direction immediately before. In particular, by giving an alarm to prompt the user to move to the opposite position, it is possible to effectively resolve the communication error state in the case where the movement immediately before is the movement that deteriorates the communication error state.

If the mobile-phone control section 408 determines that a communication error has occurred in a preamble or a SYNC code in packet data, the mobile-phone control section 408 causes the voltage measurement section 410 to measure a voltage of the antenna end P. At the same time, if the mobile-phone control section 408 determines that a communication error has occurred in a data main body or a CRC in the packet data, the mobile-phone control section 408 does not cause the voltage measurement section 410 to measure a voltage of the antenna end P. This is because in the case where a communication error occurs in a preamble or a SYNC code, a degree of communication error is large, and thus it is necessary to use a measurement voltage of the antenna end P in order to resolve the communication error.

When the mobile-phone control section 408 determines that the communication state is a communication error state, the mobile-phone control section 408 causes the alarming section to give an alarm prompting the user to change the relative position of the communication terminal 100 with the IC card 200 to the display section 412, etc., after the voltage measurement section 410 measures a voltage of the antenna end P. And if the voltage of the antenna end P measured again after the alarming section has give the alarm is lower than the voltage measured before the alarming, the mobile-phone control section 408 causes the alarming section to give an alarm with a changed alarming mode. For example, the mobile-phone control section 408 causes the alarming section to give an alarm for moving in a direction different from the movement direction of the communication terminal 100 by the alarming of immediately before. Thereby, it is possible to guide movement of the communication terminal 100 such that the communication antenna 104 is located at a suitable position for communicating with the IC card 200, and thus it becomes easy to resolve the communication error state.

The communication terminal 100 has a CPU (constitutes the above-described mobile-phone control section 408), a ROM, a RAM, etc. The CPU loads programs read from the ROM, or an external storage device, etc., onto the RAM, and executes the programs so as to achieve various kinds of processing (the alarming processing described later, etc., at the time of communication failure). In this regard, the program can be recorded on a recording medium, or can be downloaded through the Internet.

3. Alarming Processing at the Time of Communication Failure

Figure 7A:
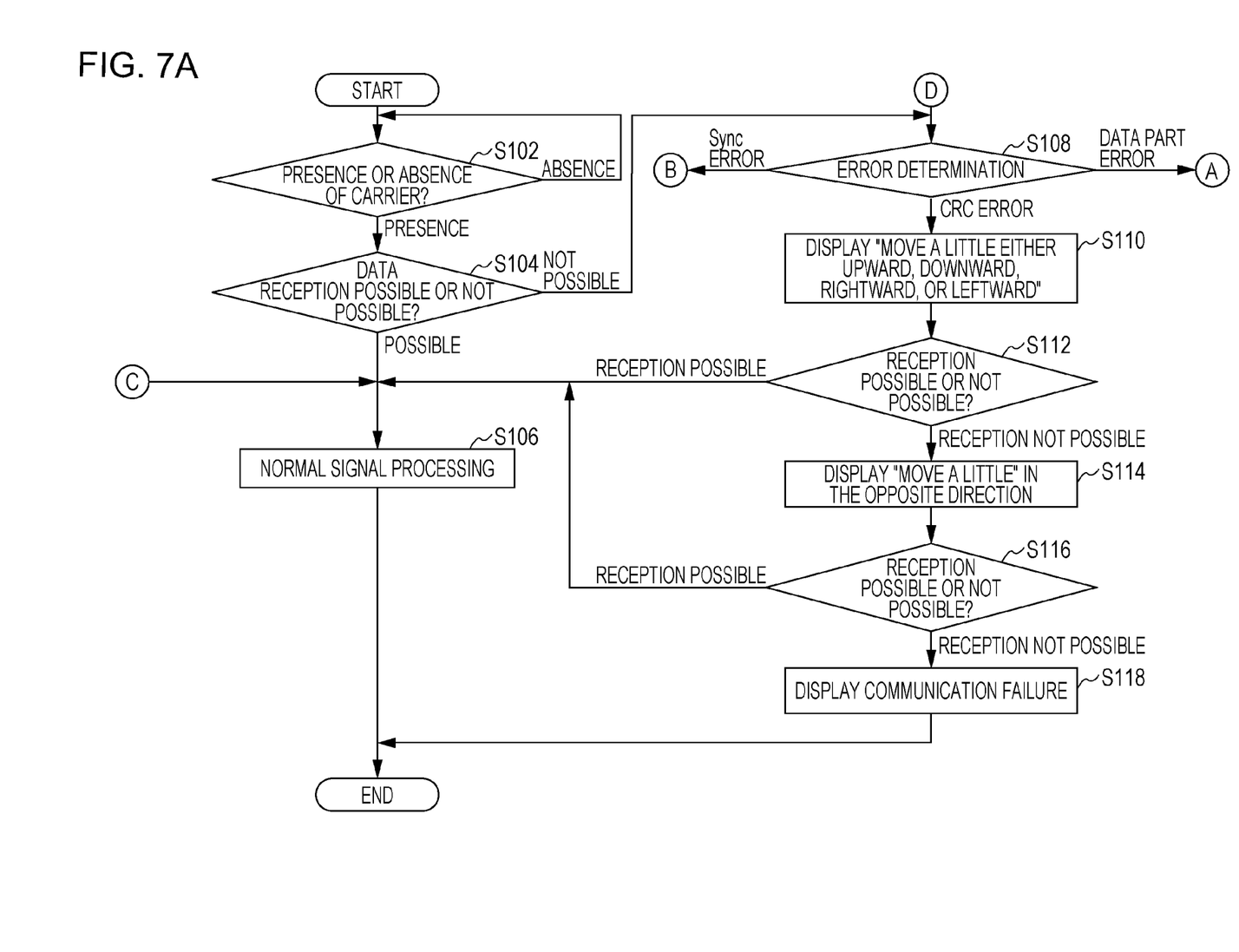
FIG. 7A is a flowchart for illustrating alarming processing at the time of communication failure.
Figure 7B:
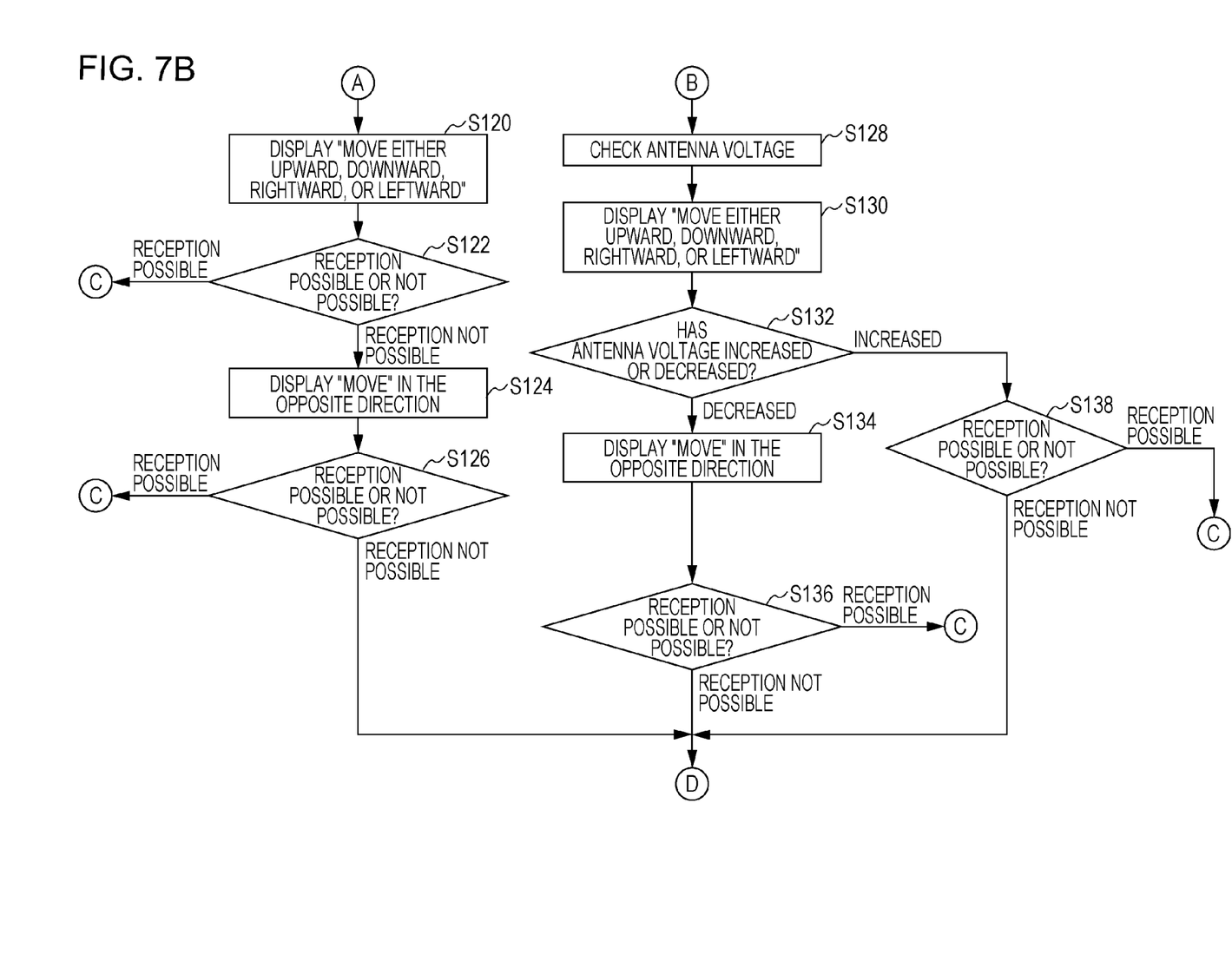
FIG. 7B is a flowchart for illustrating alarming processing at the time of communication failure.

A description will be given of alarming processing at the time of communication failure with reference to FIG. 7A and FIG. 7B. FIG. 7A and FIG. 7B are flowcharts for illustrating the alarming processing at the time of communication failure. This processing is achieved by the CPU executing the programs stored in the ROM, etc.

The flowchart in FIG. 7A is started from a state in which the power to the communication terminal 100 is turned ON. First, the non-contact communication IC 406 of the communication terminal 100 determines whether there is a carrier wave from the IC card 200 or not (step S102).

If determined that there is no carrier wave from the IC card 200 in step S102, the non-contact communication IC 406 waits for a carrier wave from the IC card 200.

On the other hand, if determined that there is a carrier wave from the IC card 200 in step S102, the non-contact communication IC 406 determines whether data reception from the IC card 200 is possible or not (step S104). That is to say, the non-contact communication IC 406 determines whether it is possible to receive a carrier wave signal including data or not.

If determined that data reception is possible in step S104, the non-contact communication IC 406 performs normal signal processing (step S106). For example, the non-contact communication IC 406 performs signal processing of the received data. Thereby, this processing is terminated.

If determined that data reception is not possible in step S104, the non-contact communication IC 406 performs error determination (step S108). Specifically, the non-contact communication IC 406 determines in which part in the packet data (FIG. 4) from the IC card 200 the error has occurred. At this time, the non-contact communication IC 406 performs error determination in the order of the preamble of the packet data, the SNYC code, the data main body, and the CRC (That is to say, in order of reception of the communication data).

In the Case of Error in CRC Part

In step S108, if the CRC is determined to be an error (failure example 4 in FIG. 5), the mobile-phone control section 408 causes the display section 412 to display, for example, a message stating "move a little either upward, downward, rightward, or leftward" as illustrated in display example 1 in FIG. 6 (step S110). The user who has viewed the message displayed in the display section 412 moves the communication terminal 100 either upward, downward, rightward, or leftward in order to resolve the communication failure state. In this regard, in which direction the user has moved the communication terminal 100 is detected by the acceleration section 420.

Next, non-contact communication IC 406 determines again whether data reception from the IC card 200 is possible or not (step S112). Specifically, if the non-contact communication IC 406 detects movement of the communication terminal 100 after the display in step 110, the non-contact communication IC 406 determines whether data reception is possible or not.

In step S112, if the communication state has been improved by the movement of the communication terminal 100, and thus it is determined that data reception is possible, the non-contact communication IC 406 performs the above-described signal processing in step S106.

In step S112, if determined data reception is not possible after the movement of the communication terminal 100, the mobile-phone control section 408 causes the display section 412 to display a message stating "move a little" in the opposite direction to the direction moved immediately before (step S114). For example, if the acceleration section 420 detects that the communication terminal 100 has moved in the left direction after the display in step S110, as illustrated in the display example 2 in FIG. 6, the mobile-phone control section 408 causes the display section 412 to display a message stating "move a little in the right direction". The user who has viewed the message displayed on the display section 412 moves the communication terminal 100 in the right direction in order to resolve the communication failure state.

Next, the non-contact communication IC 406 determines whether data reception from the IC card 200 is possible or not in the same manner in step S112 (step S116). And in step S116, if determined that the data reception is possible, the non-contact communication IC 406 performs the signal processing in step S106.

In step S116, if determined that the data reception is not possible, the mobile-phone control section 408 causes the display section 412 to display a communication failure (for example, display in FIG. 9) (step S118).

Thereby, this processing in terminated, and the user retries movement. In this regard, in step S116, if determined that data reception is not possible, the error determination in step S108 may be repeated again in place of the display of the communication failure.

In the Case of Error in Data Main Body

In step S108, if the data main body is determined to be in an error state (failure example 3 in FIG. 5), the mobile-phone control section 408 causes the display section 412 to display a message stating "move either upward, downward, rightward, or leftward" as illustrated in the display example 3 in FIG. 6, for example (step S120). The message contents displayed in step S120 is different from the message contents displayed in step S110, and prompts the user to move the communication terminal 100 greatly.

Next, the non-contact communication IC 406 determines again whether data reception from the IC card 200 is possible or not (step S122). In step S122, if determined that data reception is possible as a result of the movement of the communication terminal 100, the non-contact communication IC 406 performs the above-described signal processing in step S106.

In step S122, if determined that data reception is not possible after the movement of the communication terminal 100, the mobile-phone control section 408 causes the display section 412 to display a message stating "move" in the opposite direction to the direction of the immediate movement (step S124). For example, after the display in step S120, if the acceleration section 420 detects movement of the communication terminal 100 in the left direction, as illustrated in the display example 4 in FIG. 6, the mobile-phone control section 408 causes the display section 412 to display a message stating "move in the right direction".

Next, in the same manner as step S122, the non-contact communication IC 406 determines whether data reception from the IC card 200 is possible or not (step S126). And in step S126, if determined that data reception is possible, the non-contact communication IC 406 performs the signal processing in step S106.

In step S126, if determined that data reception is not possible, the non-contact communication IC 406 performs the error determination in step 108 again. The reason for performing the error determination again is that the failure in the data reception might be caused by the occurrence of an error in a part other than the data main body in the packet data (for example, CRC), and thus it is necessary to resolve this error.

In the Case of Error in SNYC Code or Preamble

In step S108, if determined that the SNYC code or the preamble in the packet data is an error (the failure example 1 and the failure example 2 in FIG. 5), the voltage measurement section 410 checks a voltage of the antenna end P of the communication antenna 104 (step S128).

Next, the mobile-phone control section 408 causes the display section 412 to display a message stating "move either upward, downward, rightward, or leftward" in the same manner as the above-described step S120 (step S130). Thereby, the user moves the communication terminal 100. When the communication terminal 100 is moved, the voltage measurement section 410 determines whether the voltage of the antenna end P increases or decreases as a result of the movement of the communication terminal 100 (step S132).

In step S132, if determined that the voltage of the antenna end P has decreased, the mobile-phone control section 408 causes the display section 412 to display a message stating "please move" in an opposite direction to the movement direction of immediately before (step S134). For example, after the display in step S130, if the acceleration section 420 detects movement of the communication terminal 100 in the left direction, the mobile-phone control section 408 causes the display section 412 to display a message stating "move in the right direction".

Next, the non-contact communication IC 406 determines again whether data reception from the IC card 200 is possible or not (step S136). In step S136, if determined that data reception is possible by movement of the communication terminal 100, the non-contact communication IC 406 performs the signal processing in the above-described step S106.

In step S136, if determined that data reception is not possible even when the communication terminal 100 has been moved, the non-contact communication IC 406 performs the error determination in step 108 again. The reason for performing the error determination again is that the failure in the data reception might be caused by the occurrence of an error in a part other than the SNYC part and the preamble part in the packet data (the CRC part, for example), and thus it is necessary to resolve this error.

In step S132, if determined that the voltage of the antenna end P has increased, the non-contact communication IC 406 determines again whether data reception from the IC card 200 is possible or not (step S138). In step S138, if determined that data reception is possible, the non-contact communication IC 406 performs the above-described signal processing in step S106.

In step S136, if determined that data reception is not possible, the non-contact communication IC 406 performs the error determination again in step 108 in the same manner as step S136.

According to the above-described present processing, by causing the display section 412 to display a message to move the communication terminal 100 at the time of non-contact communication failure (FIG. 6), it is possible to prompt the user to move the communication terminal 100. Accordingly, the user moves the communication terminal 100 to a suitable position so that it becomes possible to perform suitable recovery at the time of communication failure.

In this regard, in this processing, the display section 412 is caused to display a message in order to prompt the user to move the communication terminal 100 at the time of communication failure. However, the present disclosure is not limited to this. For example, an alarm for moving the communication terminal 100 may be given by sound output from the speaker 418, lighting of the LED 416, vibration of the vibration section 414, etc.

Also, an alarm may be given by a combination of a plurality of sections, the display section 412, the speaker 418, the LED 416, the vibration section 414 (for example, display of the display section 412 and lighting of the LED 416).

4. Summary

As described above, in the communication terminal 100 according to the present embodiment, a communication state of the communication antenna 104 with the IC card is determined. If determined that the communication state is a communication error state, the alarming section, such as a display section 412, etc., gives an alarm prompting the user to change the relative position of the communication terminal 100 and the IC card 200 on the basis of the communication data at the time of communication error. The user becomes aware of a countermeasure against the non-contact communication failure by the alarm contents from the alarming section. Accordingly, the user changes the relative position of the communication terminal 100 with the IC card 200 (moves the communication terminal 100) on the basis of the alarm contents so as to make it possible to suitably resolve the communication error state.

Figure 8:
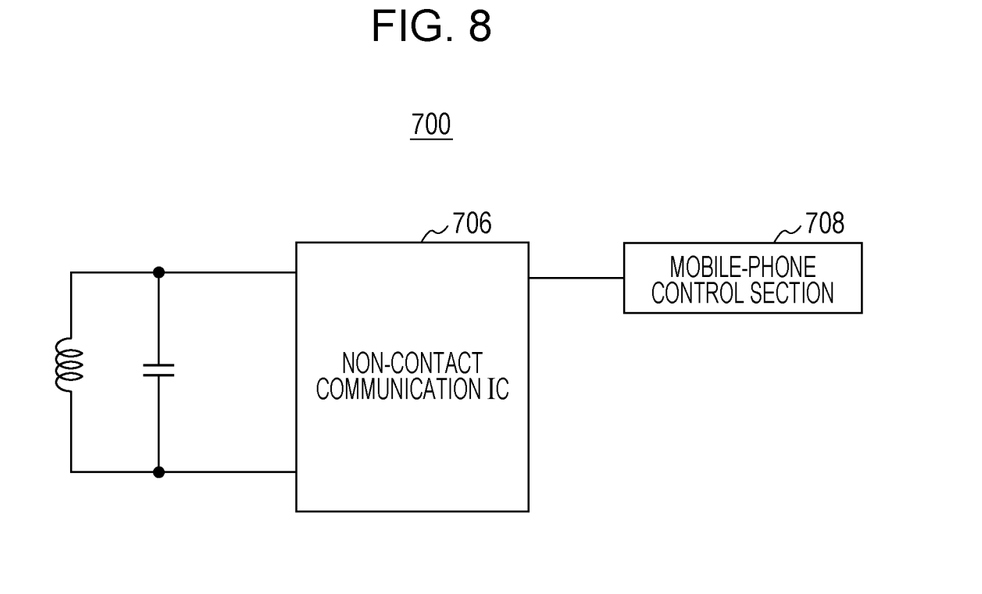
FIG. 8 is a diagram illustrating a configuration of a communication terminal according to a comparative example.
Figure 9:
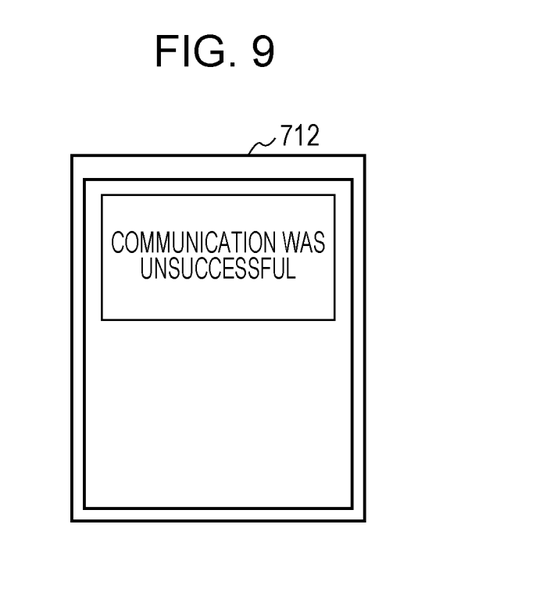
FIG. 9 is a diagram illustrating a display example of a display section of the communication terminal according to the comparative example.

Here, a description will be further given of effectiveness of the communication terminal 100 according to the present embodiment in comparison with a comparative example illustrated in FIG. 8 and FIG. 9. FIG. 8 is a diagram illustrating a configuration of a communication terminal according to the comparative example. FIG. 9 is a diagram illustrating a display example of a display section of the communication terminal according to the comparative example.

First, a description will be given of the comparative example. A display section 712 of a communication terminal 700 according to the comparative example displays a message (a communication error message) illustrated in FIG. 9 at the time of non-contact communication failure. Accordingly, the user who has seen the message in FIG. 9 is aware of a communication error state, but is not aware of a cause and a recovery method of the communication error. It is therefore difficult for the user to suitably resolve the communication error state at the time of the occurrence of a communication error.

In contrast, in the present embodiment illustrated in FIG. 6, a message prompting the user to move the communication terminal 100 is displayed in order to resolve the communication error. Accordingly, unlike the display illustrated in FIG. 9, the user is allowed to be aware of a specific countermeasure, and thus it becomes easy for the user to resolve the communication error state.

Also, in the communication terminal 100 according to the present embodiment, unlike the configuration of the communication terminal 700 illustrated in FIG. 8, the measurement result of the voltage measurement section 410 is checked, and is reported to the alarming section, and thus it is possible to move the communication terminal 100 such that the communication antenna 104 is located at a suitable position.

In the above, a detailed description has been given of preferred embodiments of the present disclosure with reference to the accompanying drawings. However, the present disclosure is not limited to such examples. It should be understood by those skilled in the art to which the present disclosure pertains that various changes and modifications may apparently occur within the spirit and the scope of the appended claims, and such changes and modifications may naturally fall within the spirit and the scope of the present disclosure.

Also, in the above-described embodiment, a description has been given by taking a mobile phone or an automatic ticket gate as a communication terminal. However, the present embodiment is not limited to this. The communication terminal may be a digital camera, a PDA, a game machine, an electronic dictionary, a tablet, etc., having a function of reader/writer and an alarming section.

Also, steps illustrated in the flowcharts of the above-described embodiment include processing that is processed in time series in accordance with the described sequence as a matter of course. Also, the steps include processing that is not necessarily performed in time series, but is performed in parallel or individually. Also, it goes without saying that it is possible to suitably change processing sequence even in the steps that are processed in time series depending on the circumstances.

In this regard, it is also possible to configure this technique in the following manner.

(1) A communication terminal including:
a communication section configured to perform non-contact communication with an external apparatus;
an alarming section; and
a control section configured to determine a communication state of the communication section with the external apparatus, and if the communication state is determined to be a communication error state, the control section configured to cause the alarming section to give an alarm prompting a user to change a relative position of the communication terminal with the external apparatus on the basis of communication data at the time of the communication error.

(2) The communication terminal according to (1), wherein the communication data is packet data received from the external apparatus, and the control section changes a displacement of the relative position in accordance with a communication error part in the packet data.

(3) The communication terminal according to (2), wherein the control section causes the alarming section to give an alarm so as to determine the displacement of the relative position in the case of the communication error in an earlier part in a reception order from the external apparatus of the packet data to be larger than the displacement of the relative position in the case of the communication error in a later part in the reception order.

(4) The communication terminal according to (3), further including a voltage measurement section configured to measure a voltage in the communication section, wherein the packet data includes a data main body having a late order in the reception order and an additional part having an early order in the reception order and indicating a start position of the data main body, and if the control section determines that the communication error occurs in the additional part among the data main body and the additional part, the control section causes the voltage measurement section to measure the voltage.

(5) The communication terminal according to (4), wherein if the communication state is determined to be a communication error state, the control section causes the alarming section to give an alarm prompting the user to change the relative position after the measurement of the voltage by the voltage measurement section, and if the voltage measured again after the alarming by the alarming section is lower than the voltage measured before the alarming, the control section causes the alarming section to alarm in a different alarming mode.

(6) The communication terminal according to any one of (1) to (5), wherein the control section causes the alarming section to give an alarm of movement of the communication terminal in a predetermined direction as the displacement of the relative position.

(7) The communication terminal according to (6), further including a movement detection section configured to detect the movement of the communication terminal after the alarming section gives the alarm, wherein if the control section determines that the communication error continues after the movement detection by the movement detection section, the control section causes the alarming section to alarm movement to a different direction from the movement direction detected by the movement detection section.

(8) The communication terminal according to (7), wherein if the control section determines that the communication error continues after the movement detection by the movement detection section, the control section causes the alarming section to alarm movement to the opposite direction to the movement direction detected by the movement detection section.

(9) The communication terminal according to any one of (1) to (8), wherein the alarming section is at least one of a display section displaying information, a light emitting section emitting light, a vibration section vibrating a main body of the terminal, and a sound outputting section outputting a sound.

(10) A method of communication, including:
a communication terminal performing non-contact communication with an external apparatus;
the communication terminal determining a communication state with the external apparatus; and
if the communication state is determined to be a communication error state, causing an alarming section of the communication terminal to give an alarm prompting a user to change a relative position of the communication terminal with the external apparatus on the basis of communication data at the time of the communication error.

(11) A program for causing a computer to perform processing including:
a communication terminal performing non-contact communication with an external apparatus;
the communication terminal determining a communication state with the external apparatus; and
if the communication state is determined to be a communication error state, causing an alarming section of the communication terminal to give an alarm prompting a user to change a relative position of the communication terminal with the external apparatus on the basis of communication data at the time of the communication error.

What is claimed is:
1. A communication terminal comprising:
a communication section configured to perform non-contact communication with an external apparatus;
an alarming section; and
a control section configured to determine a communication state of the communication section with the external apparatus, and if the communication state is determined to be a communication error state, the control section configured to cause the alarming section to give an alarm prompting a user to change a relative position of the communication terminal with the external apparatus on the basis of communication data at the time of the communication error,
the communication data is packet data received from the external apparatus, and
the control section is configured to change a displacement of the relative position in accordance with a communication error part in the packet data.

2. The communication terminal according to claim 1, in which the packet data includes a number of parts which are received in a reception order from the external apparatus, and
in which the control section causes the alarming section to give an alarm so as to determine the displacement of the relative position in the case of the communication error in a part which is earlier in the reception order of the packet data to be larger than the displacement of the relative position in the case of the communication error in another part which is later in the reception order.

3. A communication terminal comprising:
a communication section configured to perform non-contact communication with an external apparatus;
an alarming section; and
a control section configured to determine a communication state of the communication section with the external apparatus, and if the communication state is determined to be a communication error state, the control section configured to cause the alarming section to give an alarm prompting a user to change a relative position of the communication terminal with the external apparatus on the basis of communication data at the time of the communication error, the communication data is packet data received from the external apparatus, the control section is configured to change a displacement of the relative position in accordance with a communication error part in the packet data, the packet data includes a number of parts which are received in a reception order from the external apparatus, and the control section is configured to cause the alarming section to give an alarm so as to determine the displacement of the relative position in the case of the communication error in a part which is earlier in the reception order of the packet data to be larger than the displacement of the relative position in the case of the communication error in another part which is later in the reception order, the communication terminal further comprising a voltage measurement section configured to measure a voltage in the communication section, wherein the packet data includes a data main body part and an additional part, the additional part having an early order in the reception order than the data main part and indicating a start position of the data main body, and when the control section determines that the communication error occurs in the additional part among the data main body part and the additional part, the control section causes the voltage measurement section to measure the voltage.

4. The communication terminal according to claim 3, wherein when the communication state is determined to be a communication error state, the control section causes the alarming section to give an alarm prompting the user to change the relative position after the measurement of the voltage by the voltage measurement section, and when the voltage measured again after the alarming by the alarming section is lower than the voltage measured before the alarming, the control section causes the alarming section to alarm in a different alarming mode.

5. The communication terminal according to claim 1, wherein the control section causes the alarming section to give an alarm of movement of the communication terminal in a predetermined direction as the displacement of the relative position.

6. The communication terminal according to claim 5, further comprising a movement detection section configured to detect the movement of the communication terminal after the alarming section gives the alarm, wherein if the control section determines that the communication error continues after the movement detection by the movement detection section, the control section causes the alarming section to alarm movement to a different direction from the movement direction detected by the movement detection section.

7. The communication terminal according to claim 6, wherein if the control section determines that the communication error continues after the movement detection by the movement detection section, the control section causes the alarming section to alarm movement to the opposite direction to the movement direction detected by the movement detection section.

8. The communication terminal according to claim 1, wherein the alarming section is at least one of a display section displaying information, a light emitting section emitting light, a vibration section vibrating a main body of the terminal, and a sound outputting section outputting a sound.

9. A method of communication, comprising:

a communication terminal performing non-contact communication with an external apparatus;

the communication terminal determining a communication state with the external apparatus; and if the communication state is determined to be a communication error state, causing an alarming section of the communication terminal to give an alarm prompting a user to change a relative position of the communication terminal with the external apparatus on the basis of communication data at the time of the communication error, the communication data is packet data received from the external apparatus, and a displacement of the relative position is changed in accordance with a communication error part in the packet data.

10. A non-transitory computer readable storage medium having stored thereon a program for causing a computer to perform processing comprising:

a communication terminal performing non-contact communication with an external apparatus;

the communication terminal determining a communication state with the external apparatus; and if the communication state is determined to be a communication error state, causing an alarming section of the communication terminal to give an alarm prompting a user to change a relative position of the communication terminal with the external apparatus on the basis of communication data at the time of the communication error, the communication data is packet data received from the external apparatus, and a displacement of the relative position is changed in accordance with a communication error part in the packet data.

* * * * *